UNITED STATES PATENT OFFICE.

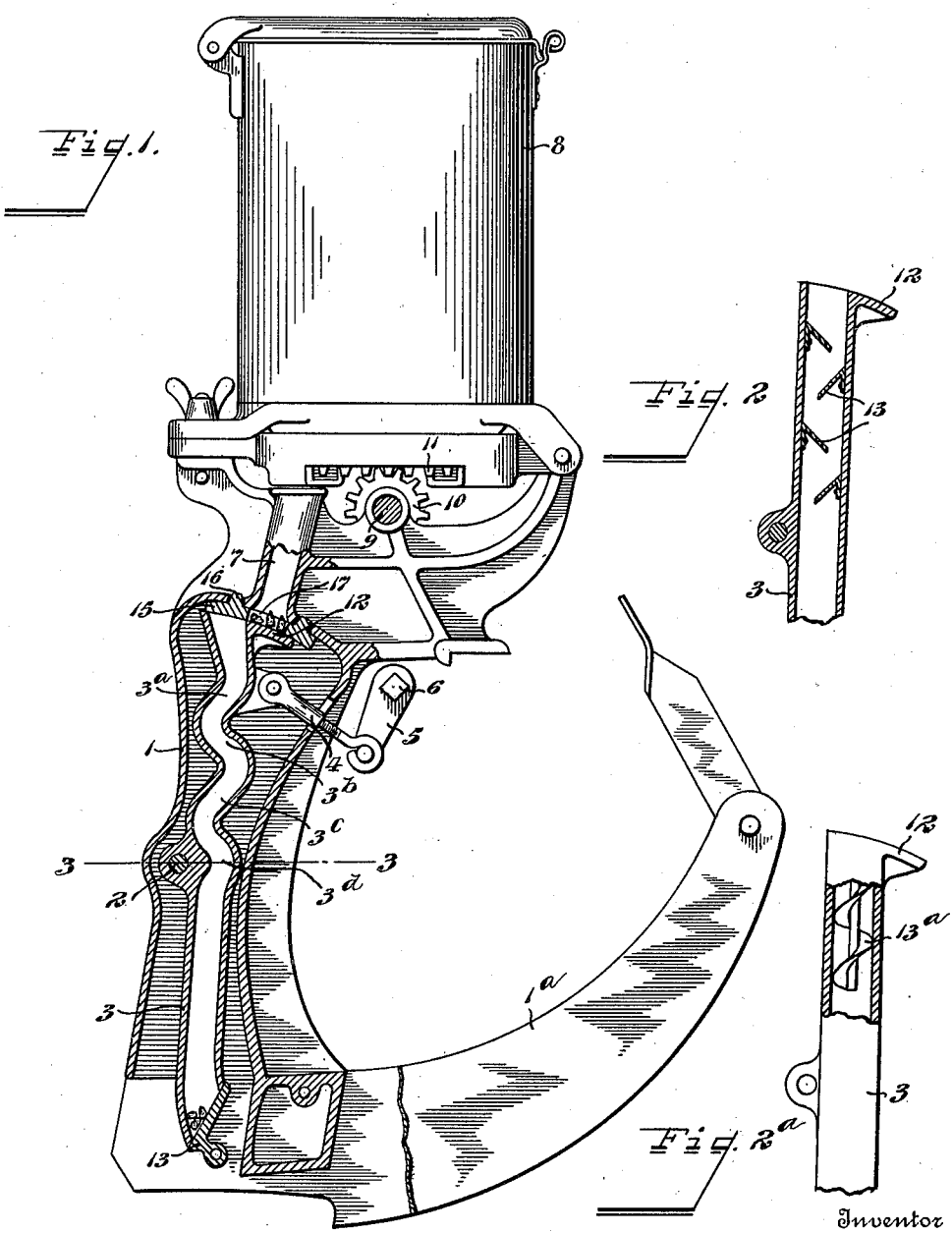

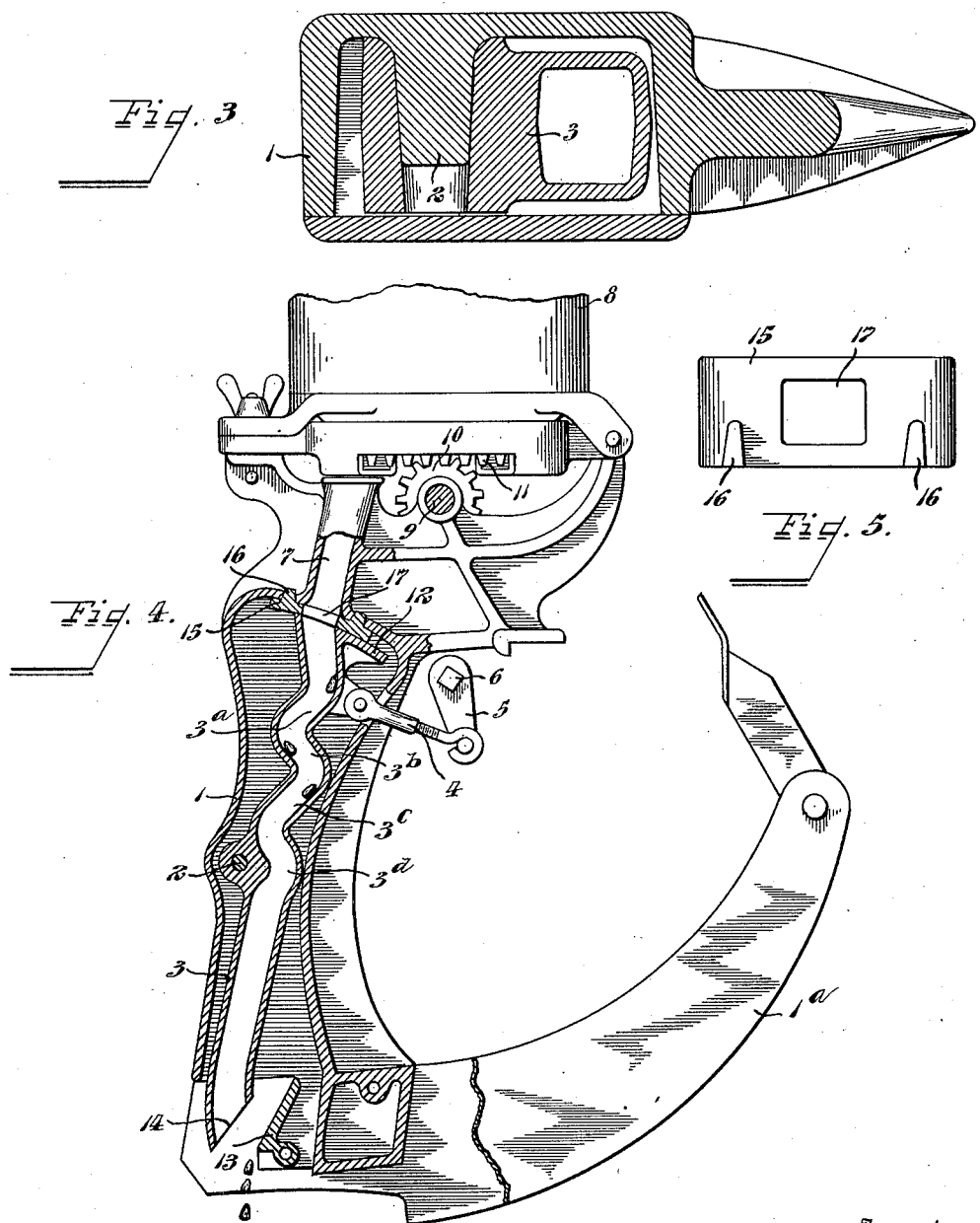

FRANK R. PACKHAM, OF SPRINGFIELD, OHIO, ASSIGNOR TO THE AMERICAN SEEDING MACHINE COMPANY, OF SPRINGFIELD, OHIO, A CORPORATION OF OHIO.

CORN-PLANTER.

1,029,711. Specification of Letters Patent. Patented June 18, 1912.

Application filed January 20, 1912. Serial No. 672,469.

*To all whom it may concern:*

Be it known that I, FRANK R. PACKHAM, a citizen of the United States, residing at Springfield, in the county of Clark and State of Ohio, have invented certain new and useful Improvements in Corn-Planters, of which the following is a specification.

My invention relates to improvements in corn planters, and more particularly to that class of corn planters which employ pivoted oscillatory seed tubes in the shank or post of the furrow opener.

An object of my invention is to provide an oscillatory seed tube which will be adapted not only for dropping the seed in hills, but which will also be capable of permitting the drilling of the seed without the necessity of alterations in the arrangement of parts; the particular object being to provide for retarding the passage of the seed through the tube without the intervention of an intermediate valve, so that the tube will have ample time to complete its oscillatory movement to insure the closing of the lower end of the tube before the arrival of the descending hill of seed through the tube, the construction being such, however, that the seed will have a continuous unbroken passage through the tube at all times.

A further object of the invention is to provide a form of valve seat and valve at the lower end of the tube which will permit the hill of seed to drop immediately and quickly into the furrow upon the first slight opening movement of the valve, so that more uniformity will be secured in the hills.

In the accompanying drawings,—Figure 1 is a side view, partly in section and partly broken away, of so much of a corn planter as is necessary to illustrate the invention. Fig. 2 is a detail in section of a modification of the seed tube. Fig. 2$^a$ is a detail of a further modification. Fig. 3 is a section on the line 3—3 of Fig. 1. Fig. 4 is a view similar to Fig. 1, showing the parts in a different position. Fig. 5 is a detail plan view of the self-alining valve seat.

Like parts are represented by similar characters of reference in the several views.

In the construction of pivoted seed tubes in corn planters of the kind referred to, it has been common to introduce into the tube a valve pivoted intermediate its ends for the purpose of retarding the dropping seed long enough to permit the lower valve to close, this intermediate valve temporarily stopping the descent of the seed, but being adapted to open and release it after the parts have moved back to their initial position. Such a construction, while answering the purpose for which it is designed, is a detriment to the drilling of the seed, which all planters are required to do at times, in which case the seed tube must afford a continuous through passage of the seed from the hopper to the trench; this being impossible when an intermediate valve is used in the tube without the necessity of removing the valve or throwing it out of commission in some manner, which requires time and is a troublesome operation. To overcome this defect in arrangement and operation, I have devised the following construction:—1 represents the ordinary hollow post or shank of the furrow opener 1$^a$ which, in the present case, is in the nature of the well known shoe. Pivotally mounted, as at 2, in said post, is the seed tube 3, pivotally connected at its upper end through the medium of the pitman connection 4, with the crank 5 of the usual rock-shaft 6; this rock-shaft being operated in the ordinary manner from the check-row devices (not shown), so as to vibrate or oscillate the tube 3 to receive and discharge the hills of seed. The upper part of the post has the usual passage 7 to receive the seed from the seeding devices in the hopper 8, which seeding devices are operated in the usual way from the operating-shaft 9 through the medium of the pinion 10 and the gear ring 11, which ring is operatively connected with the seed dropping plate. As the seed falls through the passage 7, it is deposited upon the lip 12, projecting laterally from the upper end of the seed tube when in the initial position shown in Fig. 1, and as the tube is drawn forwardly by the action of the check-row devices, the seeds so deposited, will drop through the tube and be retained at the lower end of the tube upon the valve seat 13, the lower end of the tube having been oscillated back upon this seat by this time; or, at least, should be, in the proper and intended operation of the devices.

In the construction shown in Figs. 1, 3 and 4, I have shown the hollow seed tube formed with an interior seedway having curves, alternating in the direction of descent, as indicated at 3ª, 3ᵇ, 3ᶜ and 3ᵈ, for the purpose of baffling or retarding the movement of the seed when liberated from the upper or primary valve, this construction providing a zigzag course of descent which has been found to effectually retard the falling kernels until the tube has been oscillated back upon the seat 13. In the form shown in the drawings, the tube is not curved for the full extent of its length, as this has not been found to be necessary, three or four zigzags or curves proving to be effective to retard the seed in the required time. It will be seen that by this construction, when a drilling operation is to be performed, all that is necessary is to oscillate the tube until it coincides with the passage 7 and then hold it in this position in any well known and suitable manner, thus affording a continuous free passage from the hopper to the trench.

In Fig. 2, I have shown a slight modification, in which the tube is provided with a series of inclined alternating baffle plates 13, for the purpose of retarding the passage of the kernels therethrough. In Fig. 2ª, a further modification is shown in the form of the baffling devices, a spiral track 13ª, being employed in this case. In the use of these oscillatory seed tubes, it has been usual to have the face of the lower valve seat arranged in a substantially horizontal plane, with the lower end of the tube adapted to swing over this seat, in consequence of which, when the tube is oscillated to discharge the seed, the seed will be thrown rearwardly a distance depending to a great extent upon the speed of the forward movement of the machine, so that there is more or less unevenness in the distances between the hills.

In my improved construction, it will be seen that the face of the lower valve seat 13 is inclined sharply downwardly and the lower end of the tube is cut away on its inner side so as to be likewise inclined as shown at 14, so that it will rest against the seat and not over it or on it. By this construction, it will readily be seen that upon the first slight oscillatory movement of the valve tube, the hill of kernels previously deposited upon the seat 13 will be permitted to drop at once by gravity into the trench and will not be thrown rearwardly off of the seat by the tube itself in the manner explained in connection with prior devices, in consequence of which a quick jerky movement of the machine will not interfere with the proper deposit of the seed or proper spacing of the hills; for it must be understood that the merest contact of the check-row lever on the knot of the check-row wire will serve to rock the tube and permit the hill of kernels to be dropped, so that an accelerated movement or a slow movement of the machine in no manner affects this operation.

To obviate any unevenness in the construction of the upper part of the post or shank of the runner and also of the upper end of the seed tube at that point where the seeds pass from the passage-way 7 into the seed tube, I have devised what may be called a self-alining valve seat 15, shown in detail in Fig. 5. In explanation of this, it might be explained that if there was any unevenness from faulty casting or otherwise of the parts at this point, there would be a tendency for the kernels to become wedged between the valve or lip 12 and the walls of the post, thus causing the seed to become broken or injured, but by inserting this floating self-alining seat, this danger is entirely obviated. This seat 15 is provided with two upwardly projecting lugs 16, which fit loosely in openings in the upper end of the post 1, and the seat 15 rests upon and is supported by the upper end of the seed tube and the lip 12, so that it will conform to any unevenness not only in the construction of the tube, but also in the fitting of the tube in the post. The valve seat 15 also has an opening 17 coinciding with the passage-way 7 of the post to permit of the passage therethrough of the kernels from the hopper.

Having thus described my invention, I claim:—

1. In a seeding machine, an oscillatory seed tube having a continuous passageway, and permanently-arranged means in said passageway for retarding the movement of the seed, the construction and arrangement of said retarding means being such as to permit the continuous movement of said seed through said tube.

2. In a seeding machine, an oscillatory seed tube, a primary valve at the upper end of said tube and a secondary valve at the lower end of said tube, said tube having a continuous passageway, and permanently-arranged means in said tube for baffling or retarding the passage of said seed, the construction and arrangement of such retarding means being such as to permit the continuous movement of said seed through said tube.

3. In a seeding machine, an oscillatory seed tube, and baffling or retarding surfaces in said tube, said tube being formed with an open space between said surfaces.

4. In a seeding machine, an oscillatory seed tube, valves at the upper and lower ends of said tube, and baffling or retarding surfaces in said tube, said tube being formed with a continuous space between said surfaces.

5. In an oscillatory seed tube for seeding machines, the combination of the tube having a passageway, the valve near the discharge end of said tube, projections from the walls of the tube intermediate the inlet and discharge ends of said tube for changing the direction of the passageway and thereby retarding the movement of the seed in said passageway.

6. In a seeding machine, an oscillatory seed tube, the interior of said tube being formed with a series of alternating downwardly inclined surfaces, for the purpose specified.

7. In a seeding machine, an oscillatory seed tube, valves located at the respective ends of said tube, and a series of inclined downwardly extending surfaces on the interior of said tube, for the purpose specified.

8. In a seeding machine, an oscillatory seed tube, a downwardly inclined valve seat at the lower end of said tube, the lower end of said tube being cut away on its inner side at an angle to conform to the inclination of said seat, for the purpose specified.

9. In a seeding machine, an oscillatory seed tube, a valve at the upper end of said tube, and a downwardly inclined valve seat at the lower end of said tube, the lower end of said tube being cut away on its inner side at an angle to correspond to the inclination of said seat, for the purpose specified.

10. In a seeding machine, a supporting post having an opening at its upper end, a hollow oscillatory seed tube in said post, a valve on the upper end of said post, said tube and valve being adapted to alternately register with the opening in said post, and a self-alining valve seat having an opening also adapted to register with said post and supported by said tube.

11. In a seeding machine, a supporting post having an opening in the upper end thereof, an oscillatory seed tube in said post having a valve at its upper end, said valve and tube being adapted to alternately register with said base opening, a self-alining valve seat interposed between the upper end of said tube and said post and having an opening registering with said post-opening, said valve seat being supported on said tube, together with means for holding it in position with respect to said post.

In testimony whereof, I have hereunto set my hand this 17th day of January 1912.

FRANK R. PACKHAM.

Witnesses:
 DORCAS DODSON,
 CHAS. I. WELCH.

---

Copies of this patent may be obtained for five cents each, by addressing the "Commissioner of Patents, Washington, D. C."